(12) United States Patent
Ishihara

(10) Patent No.: US 10,005,162 B2
(45) Date of Patent: Jun. 26, 2018

(54) MACHINE TOOL INCLUDING CHIP CONVEYOR

(71) Applicant: FANUC CORPORATION, Yamanashi (JP)

(72) Inventor: Mitsuyoshi Ishihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 81 days.

(21) Appl. No.: 14/712,220

(22) Filed: May 14, 2015

(65) Prior Publication Data

US 2015/0336231 A1    Nov. 26, 2015

(30) Foreign Application Priority Data

May 21, 2014    (JP) ................................. 2014-105561

(51) Int. Cl.
| | |
|---|---|
| *B23Q 11/08* | (2006.01) |
| *B23Q 11/00* | (2006.01) |
| *B65G 33/32* | (2006.01) |
| *B65G 33/04* | (2006.01) |

(52) U.S. Cl.
CPC .......... *B23Q 11/0057* (2013.01); *B23Q 11/08* (2013.01); *B65G 33/04* (2013.01); *B65G 33/32* (2013.01); *Y10T 409/30392* (2015.01); *Y10T 409/304088* (2015.01)

(58) Field of Classification Search
CPC ................ B23Q 11/0057; B23Q 11/08; Y10T 409/304088; Y10T 408/50; B65G 33/14; B65G 33/16; B65G 33/18; B65G 33/20; B65G 33/22; B65G 33/32; B65G 33/04

USPC ........ 198/658, 671, 672, 677; 384/256, 257, 384/443, 416, 419
See application file for complete search history.

(56) References Cited

U.S. PATENT DOCUMENTS

| | | | | |
|---|---|---|---|---|
| 3,197,075 A | * | 7/1965 | Hansen ................... | B65G 33/00 198/550.1 |
| 3,820,860 A | * | 6/1974 | Stone ...................... | F16C 35/02 198/672 |
| 4,989,716 A | * | 2/1991 | Stuckey .................. | B65G 33/32 198/311 |

(Continued)

FOREIGN PATENT DOCUMENTS

| | | |
|---|---|---|
| CN | 2280075 Y | 4/1998 |
| CN | 101023008 A | 8/2007 |

(Continued)

OTHER PUBLICATIONS

Report Information from ProQuest Dialog obtained at http://dialog.proquest.com/professional/lookuppatent?accountid=161361 (last visited Dec. 17, 2016).*

(Continued)

*Primary Examiner* — Ryan Rufo
(74) *Attorney, Agent, or Firm* — Hauptman Ham, LLP

(57) ABSTRACT

A chip conveyor which discharges chips produced by a machine tool from the inside of a splash guard is provided inside the splash guard that prevents the chips from being scattered. A chip carrying unit of the chip conveyor is attached to the splash guard so as to be movable with respect to the splash guard in the up and down direction. Accordingly, even when the chips are stuck between the chip carrying unit and the splash guard, the chip carrying unit automatically moves, and hence the chip stuck state may be resolved.

4 Claims, 8 Drawing Sheets

(56) References Cited

U.S. PATENT DOCUMENTS

| | | | | |
|---|---|---|---|---|
| 5,553,534 | A | * | 9/1996 | Soavi .................. B23Q 11/0057 100/145 |
| 2002/0063039 | A1 | * | 5/2002 | Lepage .................. B65G 33/08 198/662 |
| 2002/0063040 | A1 | * | 5/2002 | Lepage .................. B65G 33/08 198/662 |
| 2002/0164222 | A1 | * | 11/2002 | Sato ........................ B23Q 7/03 409/137 |
| 2009/0145725 | A1 | | 6/2009 | Tetsumoto et al. |
| 2010/0221082 | A1 | | 9/2010 | Meidar et al. |
| 2015/0336231 | A1 | | 11/2015 | Ishihara |

FOREIGN PATENT DOCUMENTS

| | | | |
|---|---|---|---|
| CN | 101795814 | A | 8/2010 |
| CN | 101979217 | A | 2/2011 |
| CN | 204673359 | U | 9/2015 |
| JP | 51-76786 | A | 7/1976 |
| JP | 63-45718 | U | 3/1988 |
| JP | 02-274453 | A * | 11/1990 ............ B23Q 11/00 |
| JP | 4-9812 | U | 1/1992 |
| JP | 6-298326 | A | 10/1994 |
| JP | 7-223718 | A | 8/1995 |
| JP | 2000-255745 | A | 9/2000 |
| JP | 2002-248607 | A | 9/2002 |
| JP | 2004-284712 | A | 10/2004 |
| JP | 2007-136635 | A | 6/2007 |
| JP | 2009-248293 | A | 10/2009 |
| JP | 2013-166628 | A | 8/2013 |

OTHER PUBLICATIONS

Decision to Grant a Patent dated Oct. 27, 2015, corresponding to Japanese Patent Application No. 2014-105561.

Office Action in CN Application No. 201510239131.X, dated Nov. 28, 2016.

* cited by examiner

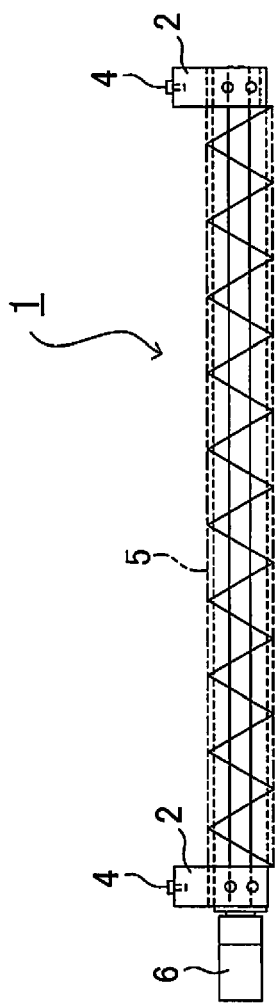
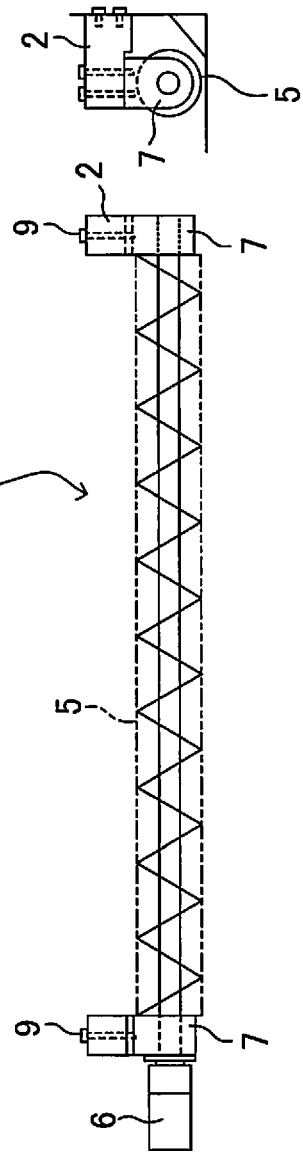

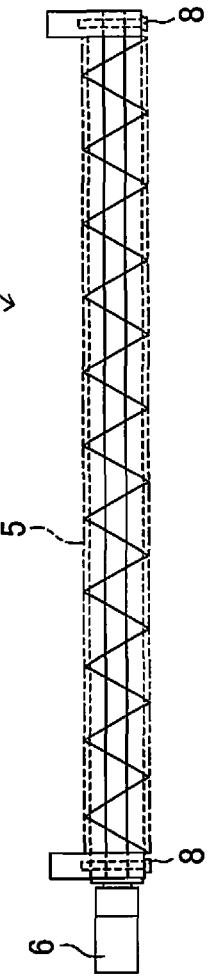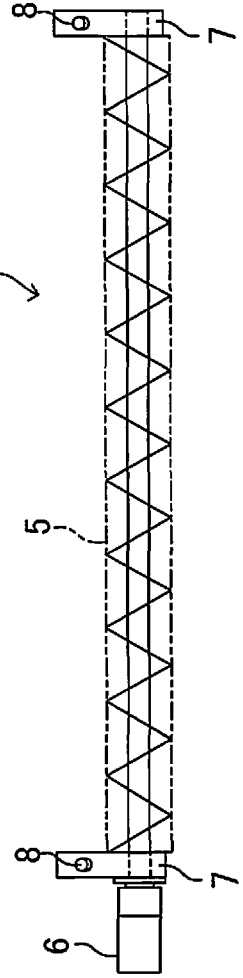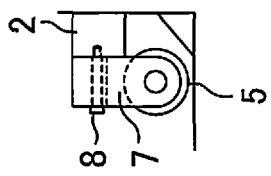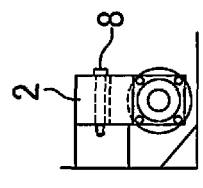

MACHINE TOOL INCLUDING CHIP CONVEYOR

RELATED APPLICATIONS

The present application claims priority of Japanese Application Number 2014-105561, filed May 21, 2014, the disclosure of which is hereby incorporated by reference herein in its entirety.

BACKGROUND OF THE INVENTION

1. Field of the Invention

The present invention relates to a machine tool including a chip conveyor.

2. Description of the Related Art

In a machine tool, there is a case where chips produced during a machining operation are accumulated therein and a mechanism unit is broken due to the intrusion of the chips into the mechanism unit. In order to prevent the breakage of the mechanism unit of the machine tool due to the intrusion of the chips, there is a need to discharge the chips accumulated in the machine tool.

As one of methods of discharging the chips, a chip conveyor is disposed in the vicinity of the chip accumulation position so as to discharge the chips to the outside. An example of the chip conveyor will be described with reference to FIGS. 1A to 1D.

A chip conveyor 1 includes a chip carrying unit 5 which carries accumulated chips. A driving motor 6 which rotationally drives the chip carrying unit 5 is connected to the chip carrying unit 5. Both ends of the chip carrying unit 5 are provided with a fixed block 7 which fixes and supports the chip carrying unit 5 thereon. A support block 2 which supports the fixed block 7 is provided above the fixed block 7, and the support block 2 and the fixed block 7 are fixed and supported by an upper fixing bolt 9. Further, the support block 2 is fixed and supported by a splash guard 10 to be described later by fixing bolts 4.

An example in which the chip conveyor 1 illustrated in FIGS. 1A to 1D is applied to the machine tool will be described with reference to FIGS. 2A to 2C. In this example, as illustrated in FIG. 2A, two chip conveyors 1 are disposed in the machine tool.

The machine tool and the chip conveyor 1 are entirely covered by the splash guard 10. The splash guard 10, the machine tool, and the like are supported by a bed 11. A table 13 is disposed on a saddle 12 of the machine tool. A workpiece 14 is installed on the table 13. A spindle 16 is provided in a column 17 of the machine tool, and a tool 15 is attached to the front end of the spindle 16. Then, the workpiece 14 on the table 13 is machined by the tool 15. In addition, Reference Numeral 18 indicates a cutting fluid processing device.

A technique involved with the chip conveyor is disclosed in JP 2009-248293 A and JP 2007-136635 A. JP 2009-248293 A discloses a technique in which a coil forming a chip conveyor used to discharge chips is immersed into a cutting fluid, and JP 2007-136635 A discloses a technique in which chips are discharged by a chip conveyor including a spiral conveyor.

In the chip conveyor disclosed in the above-described patent documents, since a gap between the chip conveyor 1 and the splash guard 10 covering the entire machine tool including the chip conveyor 1 is narrow, there is a concern that the chips may be stuck between the splash guard 10 and the chip carrying unit 5 when the chips are carried by the chip conveyor 1.

JP 2009-248293 A described above discloses that a screw is caught by the accumulated chips. However, since there is a need to collect the cutting fluid in a hopper as a countermeasure thereof, a large amount of cutting fluid is needed. Further, JP 2007-136635 A describes the spiral type chip conveyor as the chip discharging member. However, the state where the chips have been stuck in the spiral coil is not disclosed, and the solving method thereof is not also disclosed.

SUMMARY OF THE INVENTION

Here, the invention is made in view of these problems, and an object thereof is to provide a machine tool including a chip conveyor capable of avoiding the stop or the breakage of a chip conveyor caused by a chip stuck state by preventing chips from being stuck in the chip conveyor, particularly in a chip carrying unit.

According to the invention, a machine tool including a chip conveyor includes a splash guard which prevents chips produced by the machine tool from being scattered, and the chip conveyor is provided inside the splash guard so as to discharge the chips from the inside of the splash guard.

According to a first embodiment of the machine tool including the chip conveyor of the invention, the chip conveyor includes a support block which is fixed to the inside of the splash guard and includes a through hole formed in the longitudinal direction, a guide shaft which is inserted into the through hole of the support block, a fixed block which is fixed to one end of the guide shaft, and a chip carrying unit which is fixed to the fixed block and carries chips, and the guide shaft is movably attached to the support block.

A gap may be formed between a lower surface of the support block and an upper surface of the fixed block so that the chip carrying unit is movable in the longitudinal direction with respect to the splash guard.

The diameter of the through hole of the support block may be set to be larger than the diameter of the guide shaft so that the chip carrying unit is movable in the lateral direction with respect to the splash guard.

A tapered surface may be provided at the end of the guide shaft opposite to the end to which the fixed block is fixed, and a tapered surface may be provided in a region corresponding to the tapered surface of the guide shaft in the periphery of the through hole of the support block.

A curved surface may be provided at the end of the guide shaft opposite to the end to which the fixed block is fixed, and a curved surface may be provided in a region corresponding to the curved surface of the guide shaft in the periphery of the through hole of the support block.

A curved surface may be provided at the end of the guide shaft opposite to the end to which the fixed block is fixed, and a tapered surface may be provided in a region corresponding to the curved surface of the guide shaft in the periphery of the through hole of the support block.

According to a second embodiment of the machine tool including the chip conveyor of the invention, the chip conveyor includes a support block which is fixed to the splash guard, a fixed block which is attached to the support block and includes a through hole formed therein, a chip carrying unit which is fixed to the fixed block and carries the chips, and a guide bolt which movably supports the fixed block with respect to the support block, and the guide bolt is inserted through the through hole of the fixed block so that the fixed block is movable with respect to the splash guard.

According to a third embodiment of the machine tool including the chip conveyor of the invention, the chip conveyor includes a support block which is fixed to the splash guard, a fixed block which is attached to the support block, a chip carrying unit which is fixed to the fixed block and carries the chips, and a guide bolt which movably supports the fixed block with respect to the support block, each of the splash guard and the support block includes a through hole, and the guide bolt is inserted through the through hole of the splash guard and the through hole of the support block so that the fixed block is movable with respect to the splash guard.

Since the invention has the above-described configuration, it is possible to provide the machine tool including the chip conveyor capable of avoiding the stop or the breakage of the chip conveyor caused by the chip stuck state by preventing chips from being stuck in the chip conveyor, particularly in the chip carrying unit.

BRIEF DESCRIPTION OF THE DRAWINGS

The above-described object, the other objects, and the feature of the invention will be apparent from the description of embodiments below with reference to the accompanying drawings. In these drawings:

FIGS. 1A to 1D are schematic diagrams illustrating a configuration of a chip conveyor of the related art, where FIG. 1A is a top view, FIG. 1B is a left side view, FIG. 1C is a right side view, and FIG. 1D is a front view;

FIG. 2A is a top view, FIG. 2B is a front view, and FIG. 2C is a right side view;

FIG. 3A is a top view, FIG. 3B is a left side view, FIG. 3C is a right side view, and FIG. 3D is a front view;

FIG. 4A is a front view and FIG. 4B is a right side view;

FIG. 5A is a top view, FIG. 5B is a front view, and FIG. 5C is a right side view;

FIG. 6A is a front view and FIG. 6B is a right side view;

FIG. 7A is a front view and FIG. 7B is a right side view;

FIG. 8A is a front view and FIG. 8B is a right side view;

FIGS. 9A to 9D are schematic diagrams illustrating a configuration of a fifth embodiment of the chip conveyor attached to the machine tool of the invention, where FIG. 5A is a top view, FIG. 5B is a left side view, FIG. 5C is a right side view, and FIG. 5D is a front view;

FIG. 9A is a front view and FIG. 9B is a right side view;

FIG. 11A is a front view and FIG. 11B is a right side view.

DETAILED DESCRIPTION OF THE PREFERRED EMBODIMENTS

First, a first embodiment of a chip conveyor attached to a machine tool of the invention will be described with reference to FIGS. 3A to 5C.

Figure 2A:
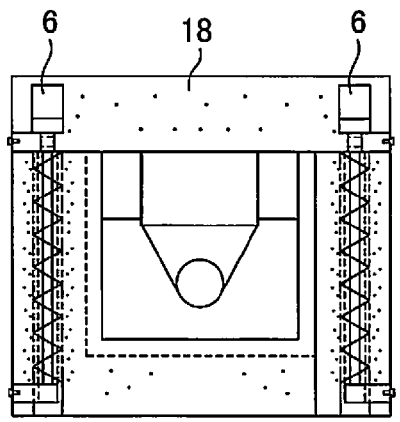
FIGS. 2A to 2C are schematic diagrams illustrating an example in which the chip conveyor illustrated in FIGS. 1A to 1D is disposed in a machine tool, where
Figure 2B:
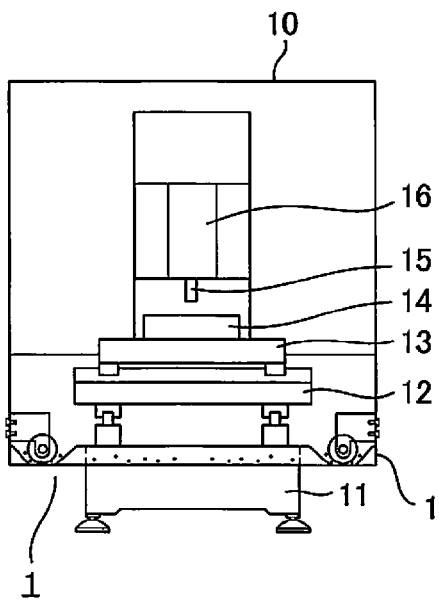
Figure 2C:
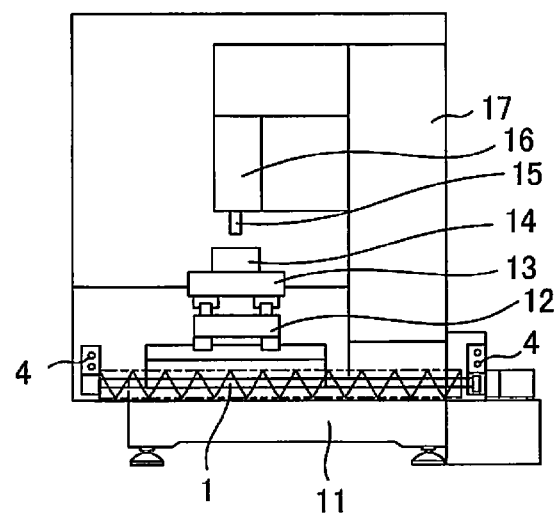
Figure 3A:
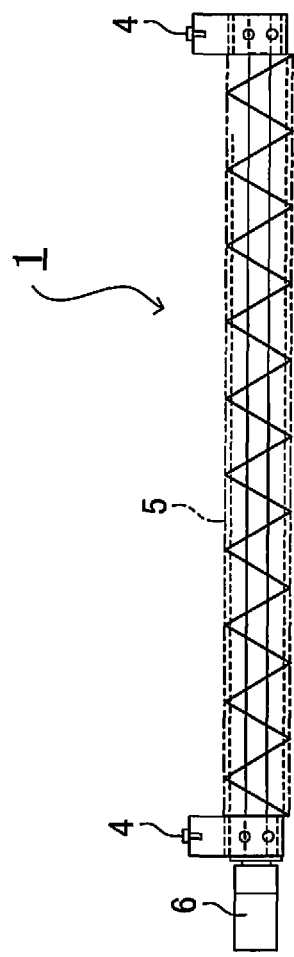
FIGS. 3A to 3D are schematic diagrams illustrating a configuration of a first embodiment of a chip conveyor attached to a machine tool of the invention, where
Figure 3C:
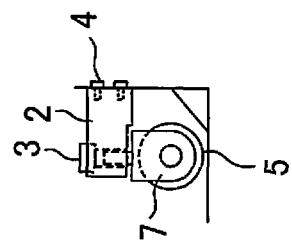
Figure 3D:
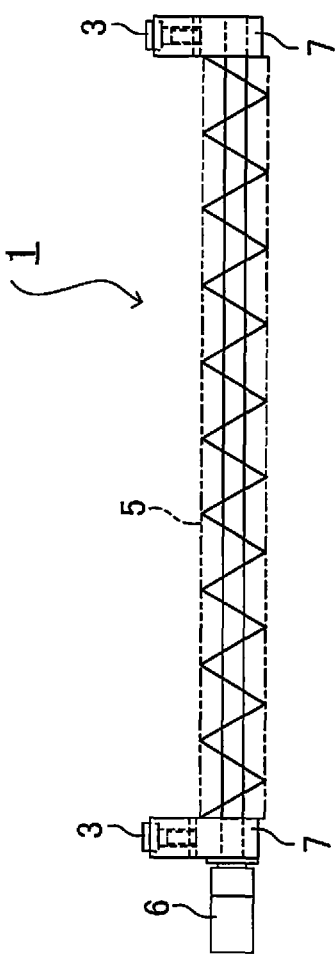
Figure 3B:
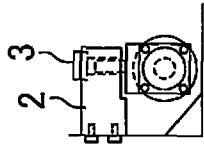

FIGS. 3A to 3C are diagrams illustrating a first embodiment of a chip conveyor 1. The embodiment is mainly different from the related art in that a guide shaft 3 is used instead of an upper fixing bolt 9 (FIG. 1D), a through hole 20 is provided in a support block 2, and the guide shaft 3 having a fixed block 7 fixed to one end thereof is supported through the through hole 20.

Figure 4A:
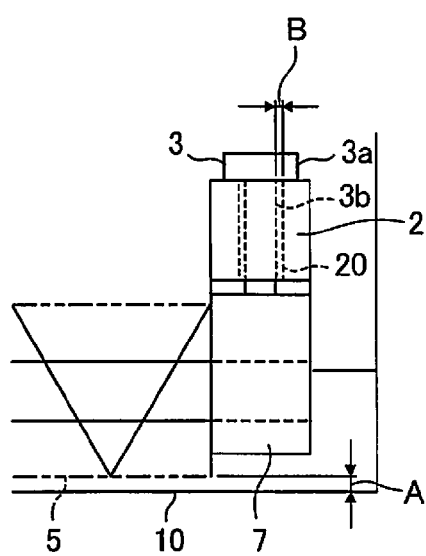
FIGS. 4A and 4B are enlarged diagrams of the vicinity of a support block and a fixed block of the chip conveyor illustrated in FIGS. 3A to 3D, where
Figure 4B:
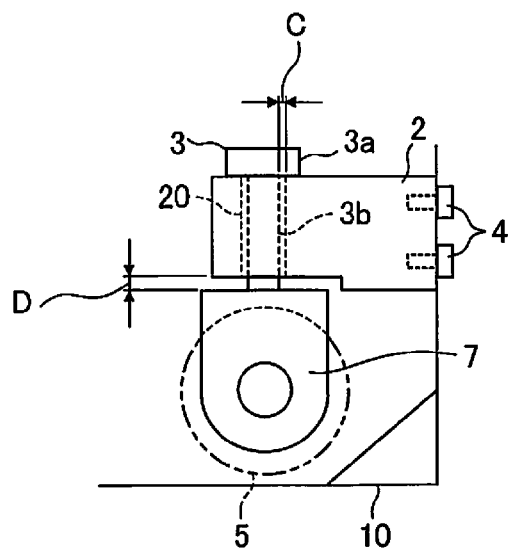

As illustrated in FIGS. 4A and 4B, the support block 2 is fixed and supported by a splash guard 10 through fixing bolts 4. Further, the cylindrical through hole 20 is provided in the support block 2 in the longitudinal direction, and the cylindrical guide shaft 3 is inserted into the through hole 20. The guide shaft 3 includes a head portion 3a and a shaft portion 3b. Here, the shaft portion 3b penetrates the through hole 20, and the fixed block 7 is fixed to the front end thereof. Then, a chip carrying unit 5 which is formed as a screw or a spiral coil and a driving motor 6 which rotates the chip carrying unit 5 are fixed to the fixed block 7, and the fixed block 7, the chip carrying unit 5, and the driving motor 6 are supported by the guide shaft 3.

Regarding the structure in which the fixed block 7 is fixed to the guide shaft 3, the length of the shaft portion 3b of the guide shaft 3 is set to be longer than the height (the thickness) of the support block 2. Accordingly, a gap D (see FIG. 4B) is formed between the lower surface of the support block 2 and the upper surface of the fixed block 7. Further, in the structure in which the fixed block 7 is fixed to the guide shaft 3, a gap A (see FIG. 4A) is also formed between the lower surface of the chip carrying unit 5 and the bottom surface of the splash guard 10.

Since the gap D is formed between the support block 2 and the fixed block 7, the chip carrying unit 5, the driving motor 6, and the fixed block 7 (hereinafter, these will be totally referred to as the 'chip carrying assembly') are movable in the longitudinal direction in the range of the gap D (movement margin), and the size of the gap A between the chip carrying unit 5 and the splash guard 10 also changes with the movement.

In addition, the diameter of the through hole 20 provided in the support block 2 is set to be larger than the diameter of the shaft portion 3b of the guide shaft 3, so that a gap is also formed between the through hole 20 and the shaft portion 3b of the guide shaft 3 penetrating the through hole. This gap becomes a movement margin B in the front to back direction and a movement margin C in the left and right direction of the chip carrying assembly with respect to the support block 2, and hence the chip carrying assembly is movable in the front to back direction and the lateral direction with respect to the support block 2.

As described above, since the gap A is formed between the lower surface of the chip carrying unit 5 and the bottom surface of the splash guard 10 and the gaps B and C are formed between the inner wall of the through hole 20 and the shaft portion 3b of the guide shaft 3, the chip carrying assembly may move with respect to the support block 2 as a complex motion in the up and down direction, the front to back direction, and the left and right direction. Further, in the embodiment, the through hole 20 is formed in a cylindrical shape, but the other shapes may be employed.

In the chip conveyor 1 with such a configuration, when the chip conveyor 1 is operated after chips are accumulated in the vicinity of the chip carrying unit 5 inside the splash guard 10, the driving motor 6 rotates, and then the chip carrying unit 5 rotates so that the chips are discharged in a predetermined direction. In the case where the chips have been stuck or start to be stuck between the chip carrying unit 5 and the splash guard 10, a force of pushing the chips toward the bottom surface of the splash guard 10 is exerted when the chip carrying unit 5 rotates, and the chips are pushed back toward the chip carrying assembly by the reaction force thereof.

As described above already, since a gap is formed between the guide shaft 3 and the through hole 20 and a gap is formed between the support block 2 and the fixed block 7 in the chip conveyor 1 of the embodiment, the chip carrying assembly is movable in the longitudinal direction or the lateral direction by the reaction force of the force of pushing the chips toward the bottom surface of the splash guard 10. For this reason, in the case where the chips have been stuck or start to be stuck between the chip carrying unit 5 and the splash guard 10, the chip carrying assembly moves in the longitudinal direction or the lateral direction. Accordingly, the positional relation or the like between the chip carrying assembly and the chips changes, and hence the chip carrying unit 5 may be rotated continuously. Thus, it is possible to resolve a state where the chips have been stuck or start to be stuck between the chip carrying unit 5 and the splash guard 10. After the chip stuck state is resolved, the chip carrying assembly returns to an original position by the own weight, and the widened gap also becomes an original state.

In addition, in the chip conveyor 1 of the embodiment, a gap is formed between the lower surface of the support block 2 and the upper surface of the fixed block 7 and a gap is formed between the through hole 20 of the support block 2 and the guide shaft 3. However, even when a gap is formed only between the lower surface of the support block 2 and the upper surface of the fixed block 7 or a gap is formed only between the through hole 20 of the support block 2 and the guide shaft 3, it is possible to resolve a state where the chips have been stuck or start to be stuck between the chip carrying unit 5 and the splash guard 10.

Figure 5A:
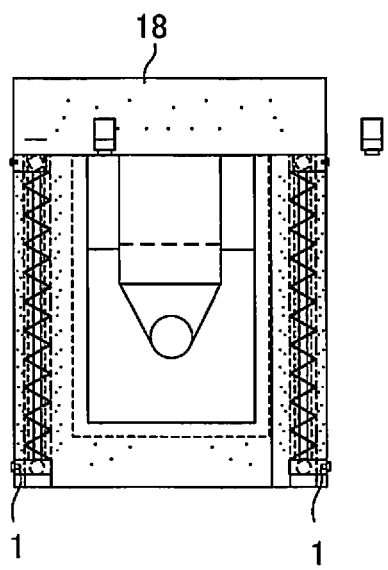
FIGS. 5A to 5C are schematic diagrams illustrating an example in which the chip conveyor illustrated in FIGS. 3A to 3D is disposed in the machine tool, where
Figure 5B:
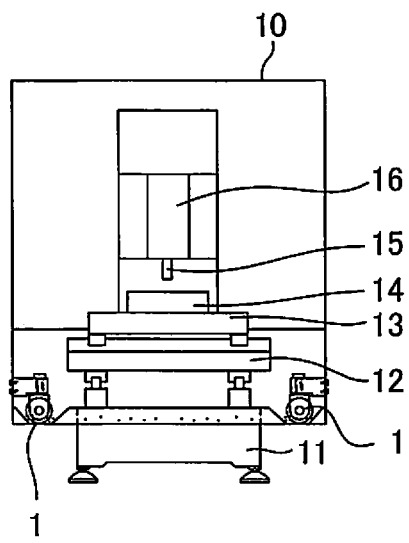
Figure 5C:
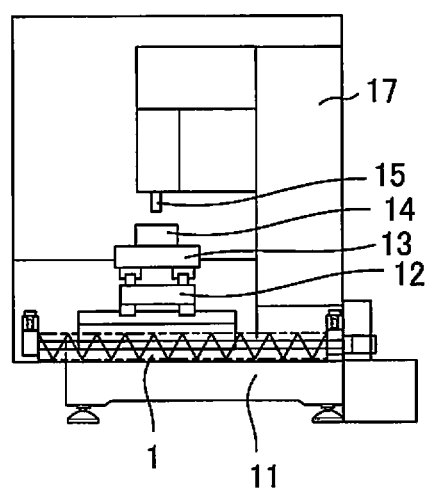

FIGS. 5A to 5C illustrate a state where the chip conveyor 1 illustrated in FIGS. 3A to 4B is disposed at two positions of the machine tool so as to be located at the left and right sides thereof.

Figure 6A:
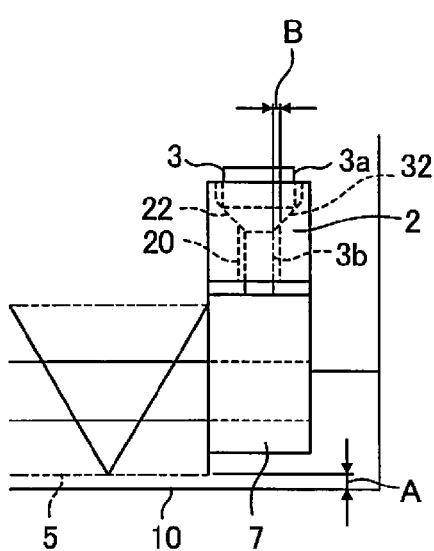
FIGS. 6A and 6B are diagrams illustrating a second embodiment of the chip conveyor attached to the machine tool of the invention (enlarged diagrams of the vicinity of the support block and the fixed block of the chip conveyor), where
Figure 6B:
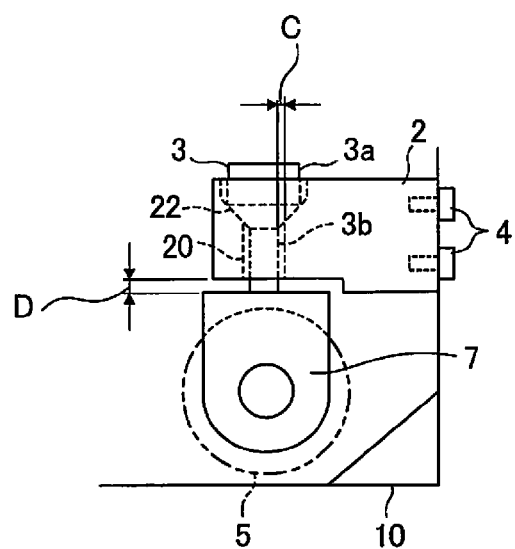

Next, a second embodiment of the chip conveyor attached to the machine tool of the invention will be described with reference to FIGS. 6A and 6B.

The chip conveyor 1 of the embodiment is different from the chip conveyor 1 of the first embodiment in that a part or the entirety of the head portion 3a of the guide shaft 3 facing the periphery of the through hole 20 at the side of the shaft portion 3b includes a tapered surface 32 and a part or the entire of the periphery of the through hole 20 of the support block 2 also includes a tapered surface 22.

A gap D is formed between the lower surface of the support block 2 and the upper surface of the fixed block 7, and gaps B and C are also formed between the shaft portion 3b of the guide shaft 3 and the through hole 20. Thus, if the chip carrying unit 5 is about to rotate when the chips are stuck or start to be stuck between the chip carrying unit 5 and the splash guard 10 (the gap A), a force of pushing the chips toward the splash guard 10 is exerted, and the chips are pushed back toward the chip carrying assembly by the reaction force thereof. Thus, since the gaps A, B, C, and D are formed, the chip carrying assembly moves in the longitudinal direction or the lateral direction, and hence the positional relation or the like between the chip carrying unit 5 and the chips changes. Accordingly, the chip carrying unit 5 may be rotated continuously. At this point, the chip conveyor of the embodiment is similar to the chip conveyor 1 of the first embodiment in that the state where the chips have been stuck or start to be stuck between the chip carrying unit 5 and the splash guard 10 may be solved.

In the chip conveyor 1 of the embodiment, since the tapered surfaces 22 and 32 are respectively formed in the head portion 3a of the guide shaft 3 facing the through hole 20 of the support block 2 at the side of the shaft portion 3b and the periphery of the through hole 20 of the support block 2, the chip carrying assembly easily returns to an original position after the chip stuck state is resolved by the movement of the chip carrying assembly.

Figure 7A:
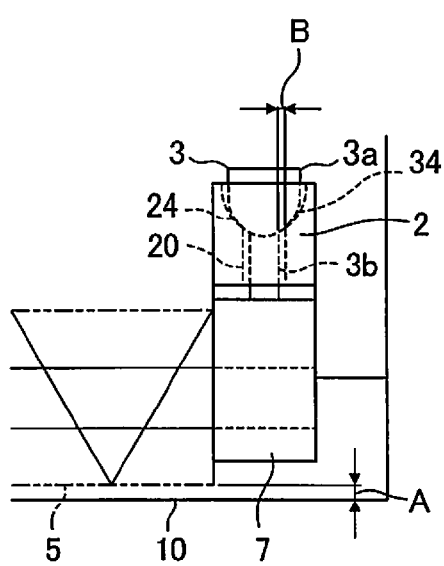
FIGS. 7A and 7B are diagrams illustrating the second embodiment of the chip conveyor attached to the machine tool of the invention (enlarged diagrams of the vicinity of the support block and the fixed block of the chip conveyor), where
Figure 7B:
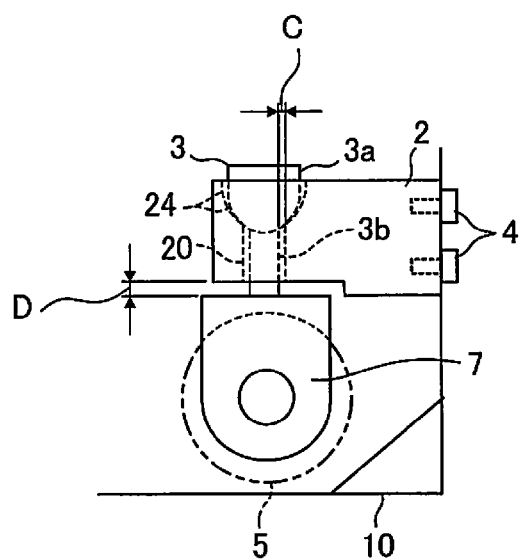

Next, a third embodiment of the chip conveyor attached to the machine tool of the invention will be described with reference to FIGS. 7A and 7B.

The chip conveyor 1 of the embodiment is different from the chip conveyor 1 of the first embodiment in that a part or the entirety of the head portion 3a of the guide shaft 3 facing the periphery of the through hole 20 at the side of the shaft portion 3b includes a curved surface 34 and a part or the entirety of the periphery of the through hole 20 of the support block 2 also includes a curved surface 24.

A gap A is formed between the lower surface of the support block 2 and the upper surface of the fixed block 7, and gaps B and C are also formed between the shaft portion 3b of the guide shaft 3 and the through hole 20. Thus, if the chip carrying unit 5 is about to rotate when the chips are stuck or start to be stuck between the chip carrying unit 5 and the splash guard 10 (the gap A), a force of pushing the chips toward the splash guard 10 is exerted, and the chips are pushed back toward the chip carrying assembly by the reaction force thereof. Thus, since the gaps A, B, C, and D are formed, the chip carrying assembly moves in the longitudinal direction or the lateral direction, and hence the positional relation or the like between the chip carrying unit 5 and the chips changes. Accordingly, the chip carrying unit 5 may be rotated continuously. At this point, the chip conveyor of the embodiment is similar to the chip conveyor 1 of the first embodiment in that the state where the chips have been stuck or start to be stuck between the chip carrying unit 5 and the splash guard 10 may be solved.

In the chip conveyor 1 of the embodiment, since the curved surfaces 24 and 34 are respectively formed in the head portion 3a of the guide shaft 3 facing the through hole 20 of the support block 2 at the side of the shaft portion 3b and the periphery of the through hole 20 of the support block 2, the chip carrying assembly easily returns to an original position after the chip stuck state is resolved by the movement of the chip carrying assembly.

Figure 8A:
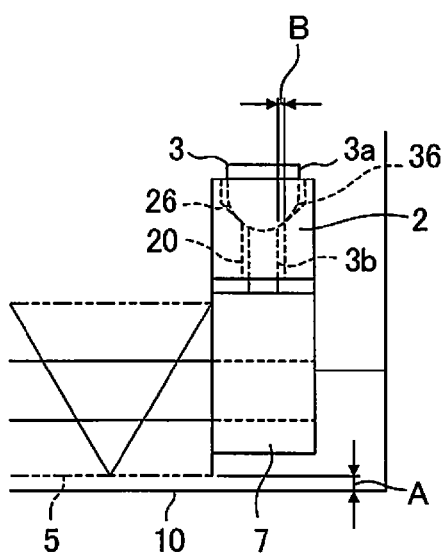
FIGS. 8A and 8B are diagrams illustrating a third embodiment of the chip conveyor attached to the machine tool of the invention (enlarged diagrams of the vicinity of the support block and the fixed block of the chip conveyor), where
Figure 8B:
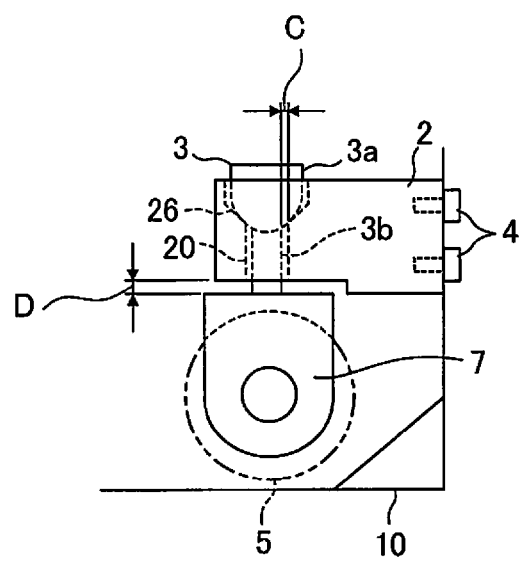

Next, a fourth embodiment of the chip conveyor attached to the machine tool of the invention will be described with reference to FIGS. 8A and 8B.

The chip conveyor 1 of the embodiment is different from the chip conveyor 1 of the first embodiment in that a part or the entirety of the head portion 3a of the guide shaft 3 facing the periphery of the through hole 20 at the side of the shaft portion 3b includes a curved surface 36 and a part or the entirety of the periphery of the through hole 20 of the support block 2 includes a tapered surface 26.

A gap D is formed between the lower surface of the support block 2 and the upper surface of the fixed block 7, and gaps B and C are also formed between the shaft portion 3b of the guide shaft 3 and the through hole 20. Thus, if the chip carrying unit 5 is about to rotate when the chips are stuck or start to be stuck between the chip carrying unit 5 and the splash guard 10 (the gap A), a force of pushing the chips toward the splash guard 10 is exerted, and the chips are pushed back toward the chip carrying assembly by the reaction force thereof. Thus, since the gaps A, B, C, and D are formed, the chip carrying assembly moves in the longitudinal direction or the lateral direction, and hence the positional relation or the like between the chip carrying unit 5 and the chips changes. Accordingly, the chip carrying unit 5 may be rotated continuously. At this point, the chip conveyor of the embodiment is similar to the chip conveyor 1 of the first embodiment in that the state where the chips have been stuck or start to be stuck between the chip carrying unit 5 and the splash guard 10 may be solved.

In the chip conveyor 1 of the embodiment, since the curved surface 36 is formed in the head portion 3a of the guide shaft 3 facing the through hole 20 of the support block 2 at the side of the shaft portion 3b and the tapered surface 26 is formed in the periphery of the through hole 20 of the support block 2, the chip carrying assembly easily returns to an original position after the chip stuck state is resolved by the movement of the chip carrying assembly.

In addition, in the chip conveyor 1 of the embodiment, the curved surface is formed in the head portion 3a of the guide shaft 3 facing the through hole 20 at the side of the shaft portion 3b and the tapered surface 26 is formed in the periphery of the through hole 20 of the support block 2. However, in contrast, the tapered surface may be formed in the head portion 3a of the guide shaft 3 facing the through hole 20 at the side of the shaft portion 3b and the curved surface may be formed in the periphery of the through hole 20 of the support block 2.

Next, a fifth embodiment of the chip conveyor attached to the machine tool of the invention will be described with reference to FIGS. 9A to 10B.

Figure 10A:
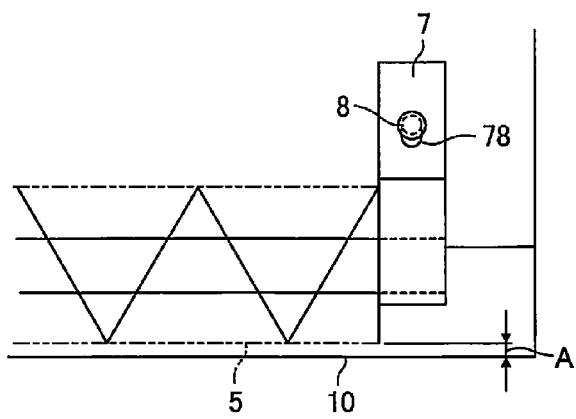
FIGS. 10A and 10B are enlarged diagrams of the vicinity of the support block and the fixed block of the chip conveyor illustrated in FIGS. 9A to 9D, where
Figure 10B:
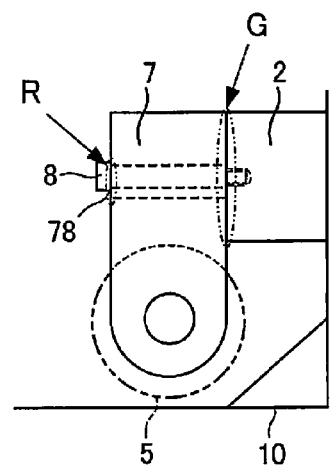

In the chip conveyor 1 of the embodiment, the support block 2 is fixed to the inside of the splash guard 10 as illustrated in FIG. 10B, and the fixed block 7 which extends to a position overlapping the support block 2 in the front view is provided in the support block 2 as illustrated in FIG. 10A. The fixed block 7 is provided with an oval hole 78.

Then, a guide bolt 8 is inserted through the oval hole 78 from the front direction, and hence the fixed block 7 is supported and fixed to the support block 2.

As illustrated in FIG. 10A, since the fixed block 7 is provided with the oval hole 78, not only the fixed block 7, but also the chip carrying unit 5 and the driving motor 6 fixed to the fixed block 7 may move in the longitudinal direction (that is, the chip carrying assembly may move in the longitudinal direction) (see a region R indicated by the dotted line of FIG. 10B). Further, as illustrated in FIG. 10B, a gap (see a region G indicated by the dotted line) is also formed between the fixed block 7 and the support block 2.

For that reason, if the chip carrying unit 5 is about to rotate when the chips are stuck or start to be stuck between the chip carrying unit 5 and the splash guard 10 (see the gap A illustrated in FIG. 10B), a force of pushing the chips toward the splash guard 10 is exerted, and the chips are pushed back toward the chip carrying assembly by the reaction force thereof. Thus, since the chip carrying assembly moves in the longitudinal direction, the positional relation or the like between the chip carrying unit 5 and the chips changes, and hence the chip carrying unit 5 may be rotated continuously. Accordingly, it is possible to resolve a state where chips have been stuck or start to be stuck between the chip carrying unit 5 and the splash guard 10.

Figure 12:
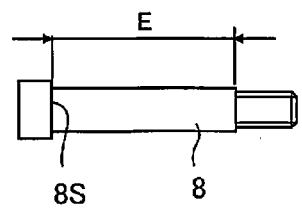
FIG. 12 is a diagram illustrating a guide bolt used in the chip conveyor illustrated in FIGS. 10A and 10B and the chip conveyor illustrated in FIGS. 11A and 11B.

FIG. 12 is a diagram illustrating the guide bolt 8 that penetrates the oval hole 78 used in the chip conveyor 1 illustrated in FIGS. 10A and 10B.

The dimension E of the guide bolt 8 is set to be a value larger than the value obtained by adding the thickness of the splash guard 10 and the thickness of the support block 2 or a value larger than the thickness of the fixed block 7. Accordingly, a gap is formed between a seating surface 8S of the guide bolt 8 and the splash guard 10 or a gap is formed between the seating surface 8S of the guide bolt 8 and the fixed block 7. Thus, the chip carrying assembly of the chip conveyor 1 may move in the longitudinal direction.

In addition, in the case of a structure in which one chip conveyor 1 is provided with both the installation place for the oval hole 78 in the fixed block 7 and the installation places for the oval holes in the splash guard 10 and the support block 2, it is desirable that the dimension E of the guide bolt 8 penetrating each oval hole be set to a value obtained by adding the thickness of the splash guard 10 and the thickness of the support block 2, or a value matching the thickness of the fixed block 7 such that the dimensions of the guide bolts are different from each other.

When a pushing-back force is exerted in the chip carrying assembly, the gap A (FIG. 10A) between the chip carrying unit 5 and the splash guard 10 is widened. However, when the chip stuck state is resolved, the chip carrying assembly returns to an original position by the own weight, and hence the gap A returns to an original distance. In addition, the oval hole 78 provided in the fixed block 7 is formed as the oval hole 78 which is long in the longitudinal direction. However, the oval forming direction is not essentially limited to the longitudinal direction, and the oval may be formed in an oblique direction. In that case, the fixed block 7 and the chip carrying assembly move in the oblique direction as the oval forming direction.

Figure 11A:
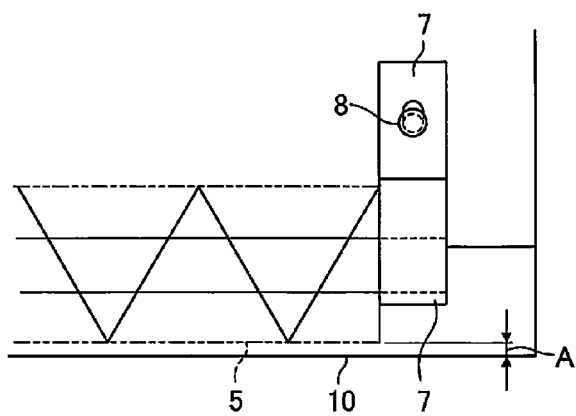
FIGS. 11A and 11B are diagrams illustrating a sixth embodiment of the chip conveyor attached to the machine tool of the invention (enlarged diagrams of the vicinity of the support block and the fixed block of the chip conveyor), where

Next, a sixth embodiment of the chip conveyor attached to the machine tool of the invention will be described with reference to FIGS. 11A and 11B.

The entire structure of the chip conveyor 1 is substantially the same as that of FIG. 9 (the fifth embodiment). Here, when the chip conveyor 1 is disposed at two positions of the machine tool so as to be located at the left and right sides, the entire structure is the same as that of FIGS. 5A to 5C.

Figure 11B:
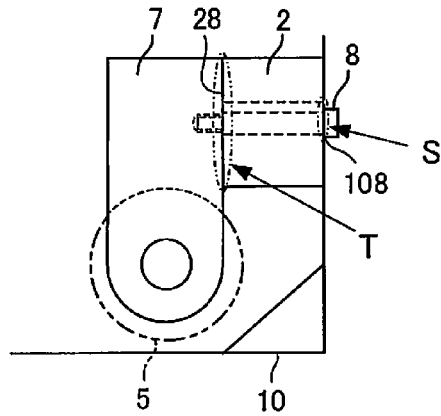

As illustrated in FIG. 11B, the splash guard 10 and the support block 2 are respectively provided with oval holes 108 and 28, and the chip carrying assembly (the chip carrying unit 5, the driving motor 6, and the fixed block 7) may be assembled so as to be movable in the longitudinal direction with respect to the splash guard 10 and the support block 2 (see a region S indicated by the dotted line of FIG. 11B) by the guide bolt 8 inserted into the oval hole. Further, as illustrated in FIG. 11B, a gap (see a region T indicated by the dotted line) is also formed between the fixed block 7 and the support block 2.

For that reason, if the chip carrying unit 5 is about to rotate when the chips are stuck or start to be stuck between the chip carrying unit 5 and the splash guard 10, a force of pushing the chips toward the splash guard 10 is exerted, and the chips are pushed back toward the chip carrying assembly by the reaction force thereof. Thus, since the chip carrying assembly moves in the longitudinal direction, the positional relation or the like between the chip carrying unit 5 and the chips changes, and hence the chip carrying unit 5 may be rotated continuously. Accordingly, it is possible to resolve a state where chips have been stuck or start to be stuck between the chip carrying unit 5 and the splash guard 10. Even in the chip conveyor 1 of the embodiment, the dimension of the guide bolt 8 is the same as that of the guide bolt 8 illustrated in FIG. 10B (the chip conveyor 1 of the fifth embodiment).

When a pushing-back force is exerted in the chip carrying assembly, the gap A (see FIG. 11A) between the chip carrying unit 5 and the splash guard 10 is widened. However, when the chip stuck state is resolved, the chip carrying assembly returns to an original position by the own weight, and hence the gap A returns to an original distance. In addition, even in the chip conveyor 1 of the embodiment, the oval holes 108 provided in the splash guard 10 and the support block 2 are provided as the oval holes 108 which are long in the longitudinal direction. However, the oval forming direction is not essentially limited to the longitudinal direction, and the oval may be formed in an oblique direction. In that case, the fixed block 7 and the chip carrying assembly move in the oblique direction as the oval forming direction.

In addition, the fifth embodiment and the sixth embodiment of the chip conveyor 1 may be used in combination such that the oval hole 78 is provided in the fixed block 7 at a certain portion of the chip conveyor 1 and the oval holes 108 are provided in the splash guard 10 and the support block 2 at the other portions thereof.

Further, the attachment surface of the support block 2 with respect to the splash guard 10 is not limited to the examples illustrated in FIG. 10B (the fifth embodiment of the chip conveyor 1) and FIG. 11B (the sixth embodiment of the chip conveyor 1), and may be set to a different surface.

In the above-described embodiments of the chip conveyor 1, the chips are discharged only by the chip carrying unit 5 of the chip conveyor 1 in the chip discharging operation, but the chips may be carried by the flowing of cutting fluid in addition to the chip carrying unit 5.

Further, the chip carrying unit 5 has been described as a screw or a spiral coil, but other members having different shapes may be used as long as the chips are carried by the rotation of the carrying unit.

In addition, as a method of moving the chip carrying assembly of the chip conveyor 1, a method may be employed in which the rotation speed or the torque of the driving motor 6 for driving the chip carrying unit 5 is detected, the chip stuck state is determined when the rotation is stopped or the torque exceeds a predetermined value, and the chip carrying assembly is moved by using an air cylinder or an electromagnet based on the determination result.

In the above-described embodiments of the chip conveyor 1, the movement margins formed by the gaps B, C, and D in the drawings may be individually set arbitrary dimensions.

Further, as an example of the machine tool of the invention, a case has been described in which the chip conveyor 1 is disposed at two positions so as to be located at the left and right sides (see FIGS. 5A and 5B). However, the number of the chip conveyors 1 (the chip carrying units 5) disposed in the machine tool is not limited to two, and only one or three or more chip conveyors may be used.

By these embodiments, the chips are not easily stuck between the splash guard 10 and the chip carrying unit 5 regardless of the material, the shape, the size, and the weight of the chip, and the chip stuck state is resolved by the movement of the chip carrying unit in the longitudinal direction or the lateral direction even when the chip stuck state occurs. Thus, it is possible to prevent the stop or the damage of the chip conveyor caused by the chip stuck state and to improve the chip discharge efficiency due to the stable operation of the chip conveyor.

The invention claimed is:
1. A machine tool including a chip conveyor, comprising:
a splash guard which prevents chips produced by the machine tool from being scattered,
wherein the chip conveyor is provided inside the splash guard and discharges the chips from the inside of the splash guard,
wherein the chip conveyor includes
a support block which is fixed to the inside of the splash guard and includes a through hole formed in the longitudinal direction,
a guide shaft which is inserted into the through hole of the support block,
a fixed block which is fixed to one end of the guide shaft, and
a chip carrying unit which is fixed to the fixed block and carries the chips,
wherein the guide shaft is movably attached to the support block, and
wherein a gap is formed between a lower surface of the support block and an upper surface of the fixed block so that the chip carrying unit is movable in the longitudinal direction with respect to the splash guard.
2. The machine tool according to claim 1,
wherein a tapered surface is provided at the end of the guide shaft opposite to the end to which the fixed block is fixed, and
wherein a corresponding tapered surface is provided in a peripheral region of the through hole of the support block that corresponds to the tapered surface of the guide shaft.
3. The machine tool according to claim 1,
wherein a curved surface is provided at the end of the guide shaft opposite to the end to which the fixed block is fixed, and
wherein a corresponding curved surface is provided in a peripheral region of the through hole of the support block that corresponds to the curved surface of the guide shaft.

4. The machine tool according to claim 1, wherein a length of a shaft portion of the guide shaft is greater than a height of the support block.

\* \* \* \* \*